(12) United States Patent
Tsai

(10) Patent No.: US 7,548,770 B2
(45) Date of Patent: *Jun. 16, 2009

(54) DIAL SYSTEM FOR A STEERING WHEEL OF AN AUTOMOBILE

(75) Inventor: Huo-Lu Tsai, Taichung Hsien (TW)

(73) Assignee: Sunrex Technology Corp. (TW)

( * ) Notice: Subject to any disclaimer, the term of this patent is extended or adjusted under 35 U.S.C. 154(b) by 490 days.

This patent is subject to a terminal disclaimer.

(21) Appl. No.: 11/325,800

(22) Filed: Jan. 5, 2006

(65) Prior Publication Data

US 2007/0155439 A1    Jul. 5, 2007

(51) Int. Cl.
*H04M 1/00* (2006.01)
(52) U.S. Cl. ............... 455/575.9; 455/569.2; 455/90.3; 455/346; 455/41.3
(58) Field of Classification Search ............. 455/569.1, 455/569.2, 570, 41.2, 41.3, 575.9, 90.3, 99, 455/345, 346, 347–351; 379/58, 59, 428, 379/60
See application file for complete search history.

(56) References Cited

U.S. PATENT DOCUMENTS

| | | | | | |
|---|---|---|---|---|---|
| 4,850,015 | A * | 7/1989 | Martin | ........................ | 379/446 |
| 6,131,042 | A * | 10/2000 | Lee et al. | ................. | 455/556.1 |
| 6,154,757 | A * | 11/2000 | Krause et al. | ............... | 715/205 |
| 6,209,767 | B1 * | 4/2001 | Liou | ........................... | 224/276 |
| 6,339,700 | B1 * | 1/2002 | Tsai | .......................... | 455/90.3 |
| 6,397,086 | B1 * | 5/2002 | Chen | ........................ | 455/569.2 |
| 6,411,823 | B1 * | 6/2002 | Chen | .......................... | 455/559 |
| 6,418,362 | B1 * | 7/2002 | St. Pierre et al. | ............. | 701/36 |
| 6,532,374 | B1 * | 3/2003 | Chennakeshu et al. | ... | 455/569.1 |
| 6,542,758 | B1 * | 4/2003 | Chennakeshu et al. | ... | 455/569.2 |
| 6,567,676 | B1 * | 5/2003 | Tsai | ........................ | 455/569.2 |
| 6,671,521 | B1 * | 12/2003 | Yu | .......................... | 455/556.1 |
| 6,690,956 | B2 * | 2/2004 | Chua et al. | ................ | 455/569.2 |
| 6,760,569 | B1 * | 7/2004 | Chen | ........................ | 455/90.1 |
| 6,980,837 | B2 * | 12/2005 | Chung | ..................... | 455/569.2 |
| 6,983,170 | B2 * | 1/2006 | Stulberger | ............... | 455/556.1 |
| 7,020,499 | B2 * | 3/2006 | Moffi et al. | .............. | 455/569.1 |
| 7,113,742 | B2 * | 9/2006 | Kindo et al. | ................ | 455/11.1 |
| 7,129,431 | B2 * | 10/2006 | Ichimura et al. | ......... | 200/61.54 |
| 7,286,857 | B1 * | 10/2007 | Walker et al. | ............ | 455/569.2 |
| 2002/0068605 | A1 * | 6/2002 | Stanley | ....................... | 455/556 |
| 2003/0023353 | A1 * | 1/2003 | Badarneh | ....................... | 701/1 |
| 2003/0032460 | A1 * | 2/2003 | Cannon et al. | .............. | 455/569 |
| 2003/0064748 | A1 * | 4/2003 | Stulberger | .................. | 455/556 |

(Continued)

*Primary Examiner*—Lana N Le
*Assistant Examiner*—RuiMeng Hu
(74) *Attorney, Agent, or Firm*—Connolly, Bove Lodge & Hultz

(57) ABSTRACT

A dial system for steering wheel of an automobile includes two dials respectively mounted on the steering wheel and each having a first housing and a dial set received in the first housing. The dial set includes a number button and multiple functional buttons partially extending the first housing for being operated. A circuit board is received in the first housing for wirelessly transmitting signals when the buttons are operated. A second housing is mounted to the first housing to form a space for receiving the dial set and the circuit board. A battery seat with a battery is laterally inserted into the space for providing power to the circuit board. A controller is disposed on the automobile for receiving and processing the signals from the first dial and the second dial.

1 Claim, 6 Drawing Sheets

U.S. PATENT DOCUMENTS

| | | | |
|---|---|---|---|
| 2003/0109290 A1* | 6/2003 | Moffi et al. | 455/569 |
| 2003/0153268 A1* | 8/2003 | Tsai | 455/41 |
| 2004/0116159 A1* | 6/2004 | Cheng | 455/569.1 |
| 2004/0121783 A1* | 6/2004 | Chua et al. | 455/456.1 |
| 2004/0204004 A1* | 10/2004 | Chen | 455/550.1 |
| 2004/0204161 A1* | 10/2004 | Yamato et al. | 455/569.1 |
| 2004/0204206 A1* | 10/2004 | Hutchison et al. | 455/575.1 |
| 2004/0214615 A1* | 10/2004 | Entenmann et al. | 455/569.2 |
| 2004/0219881 A1* | 11/2004 | Kramp et al. | 455/41.2 |
| 2005/0021190 A1* | 1/2005 | Worrell et al. | 701/1 |
| 2005/0054386 A1* | 3/2005 | Chung | 455/569.1 |
| 2005/0096099 A1* | 5/2005 | Barclay et al. | 455/569.2 |
| 2006/0089176 A1* | 4/2006 | Oki | 455/569.1 |
| 2006/0152432 A1* | 7/2006 | Delgado Acarreta | 345/1.1 |
| 2006/0178169 A1* | 8/2006 | Dunn et al. | 455/569.2 |
| 2007/0042809 A1* | 2/2007 | Angelhag | 455/569.1 |
| 2007/0050061 A1* | 3/2007 | Klein et al. | 700/94 |
| 2007/0082713 A1* | 4/2007 | Tsai | 455/569.2 |
| 2007/0111710 A1* | 5/2007 | Pietruszka et al. | 455/414.1 |

\* cited by examiner

DIAL SYSTEM FOR A STEERING WHEEL OF AN AUTOMOBILE

BACKGROUND OF THE INVENTION

1. Field of the Invention

The present invention relates to dial system, and more particularly to a dial system for a steering wheel of an automobile co-operating with a mobile phone that has a bluetooth module.

2. Description of Related Art

A conventional mobile phone with a hand-free receiver in accordance with the prior is mounted in an automobile so that the driver in the automobile can perform the dialogue function during driving operating the steering wheel of the automobile without having to hold the mobile phone during driving.

However, the driver still to press the press buttons on the mobile phone for performing a dial function whereby the driver's hand has to leave the steering wheel so as to press the press buttons while the driver has to turn around his head to watch the numbers on the press buttons for dialing the correct telephone numbers so that the driver's view of sight will deviate the direction of travel of the automobile, thereby easily causing danger to the driver during driving.

There are many inventions are provided to overcome the above problem, such as the U.S. Pat. No. 6,339,700 and U.S. Pat. No. 6,567,676. However, the two patents contain some disadvantages that need to be advantageously altered. As to the U.S. Pat. No. 6,339,700, the buttons are mounted on the steering wheel and equally divided the steering wheel into several sections. Consequently, the buttons are separated from one another. It is hard to dial a complete telephone number and the driver may unwillingly press the buttons during turning the steering wheel. As to the U.S. Pat. No. 6,567,676, the dial communication devices respectively clamp the steering wheel so that the connection between the dial communication devices and the steering wheel is unstable. In addition, the U.S. Pat. No. 6,567,676 transmits the signal from the two dial communication devices to the mainframe by wires that may be entwined when the driver turns the steering wheel.

The present invention has arisen to mitigate and/or obviate the disadvantages of the conventional dial device that is mounted on the steering wheel of an automobile.

SUMMARY OF THE INVENTION

The main objective of the present invention is to provide an improved dial system for steering wheel of an automobile co-operating with a mobile phone for promoting the safety when dialing telephone number during driving.

To achieve the objective, the dial system in accordance with the present invention includes two dials respectively mounted on the steering wheel and each having a first housing and a dial set received in the first housing. The dial set includes a number button and multiple functional buttons partially extending the first housing for being operated. A circuit board is received in the first housing for wirelessly transmitting signals when the buttons are operated. A second housing is mounted to the first housing to form a space for receiving the dial set and the circuit board. A battery seat with a battery is laterally inserted into the space for providing power to the circuit board. A controller is disposed on the automobile for receiving and processing the signals from the first dial and the second dial.

Further benefits and advantages of the present invention will become apparent after a careful reading of the detailed description with appropriate reference to the accompanying drawings.

DETAILED DESCRIPTION OF THE INVENTION

Figure 1:
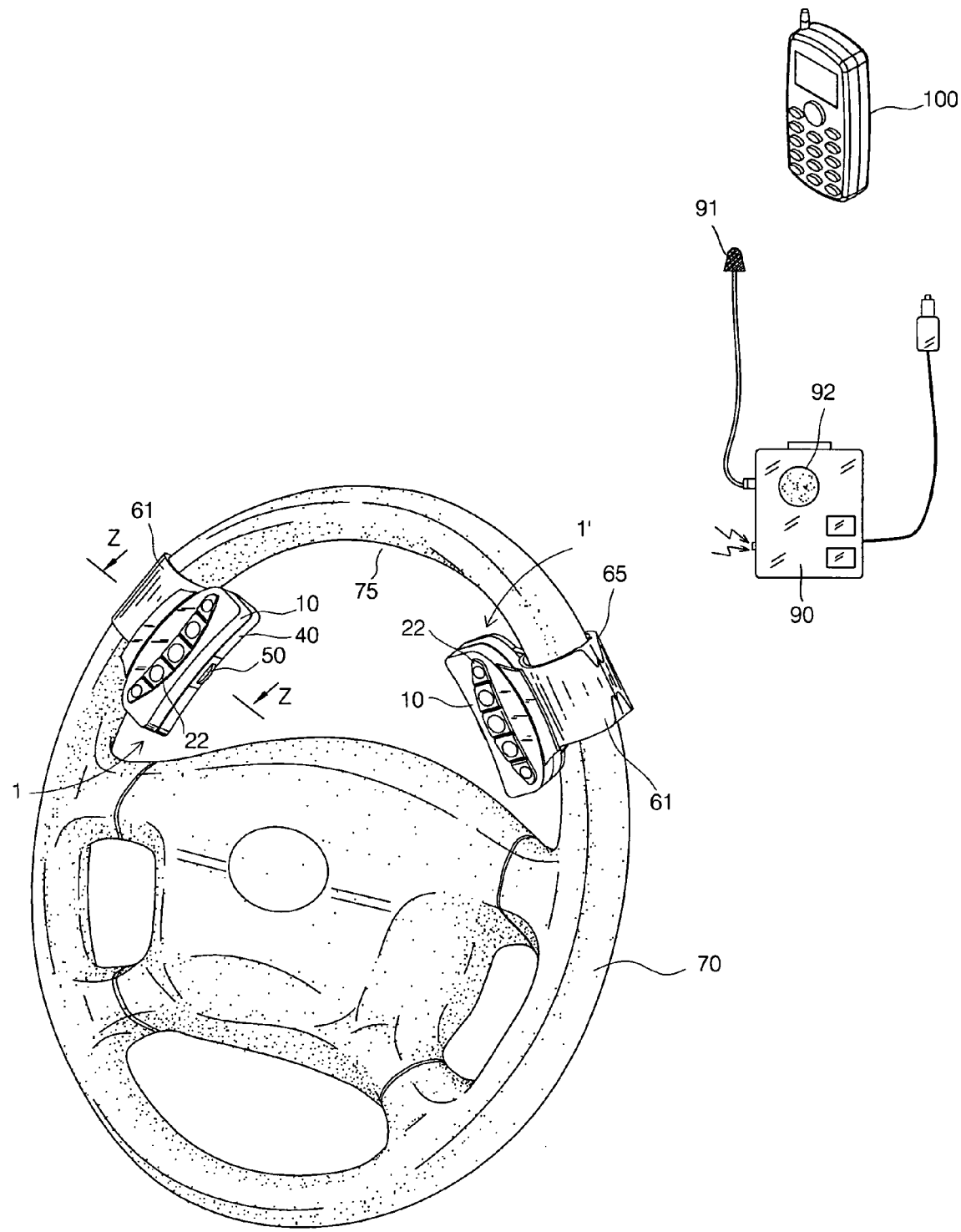
FIG. 1 is a perspective schematic view of a dial system for a steering wheel of an automobile.
Figure 2:
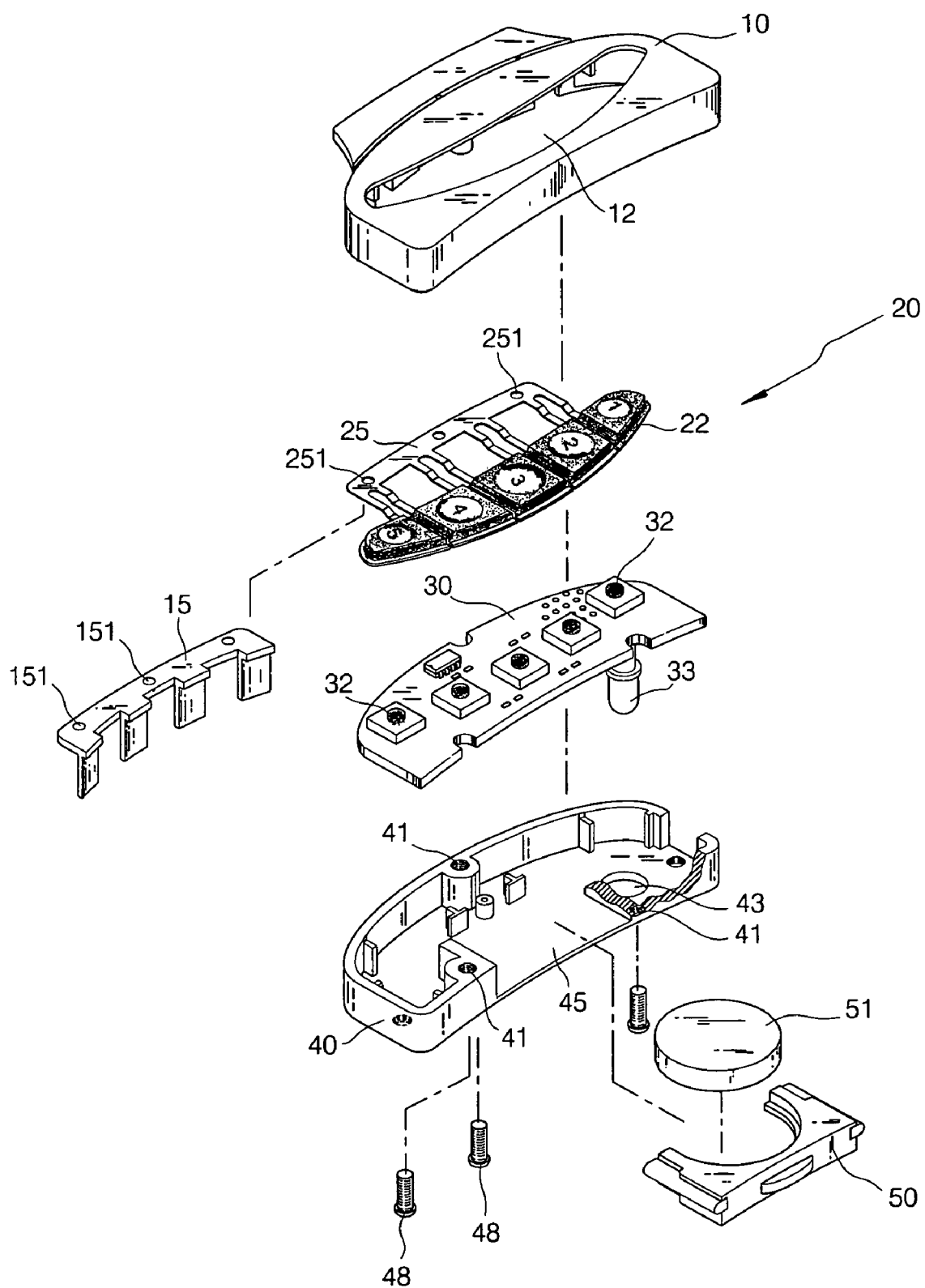
FIG. 2 is an exploded perspective view of a first dial of the dial system in FIG. 1.
Figure 3:
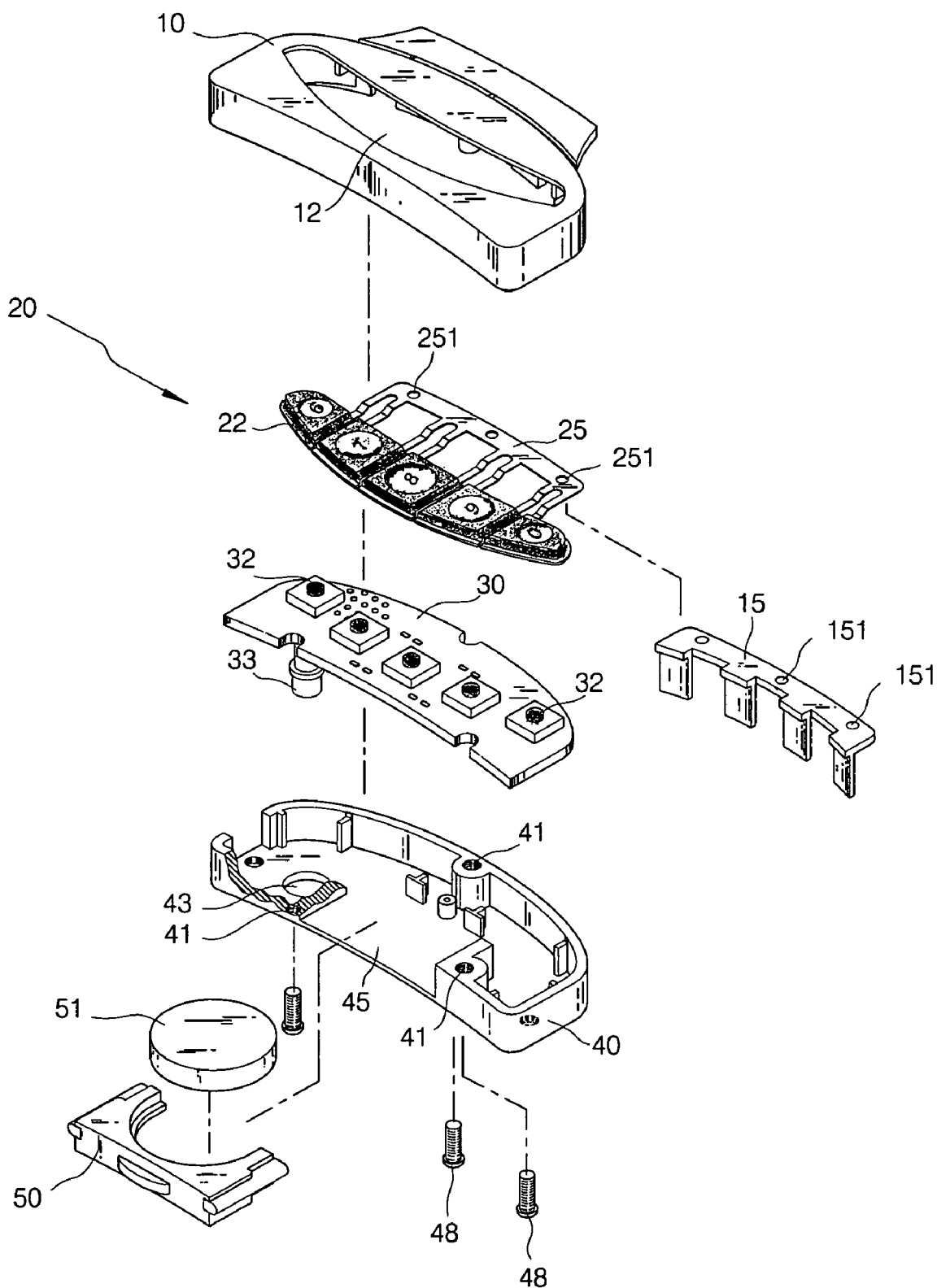
FIG. 3 is an exploded perspective view of a second dial of the dial system in FIG. 1.
Figure 4:
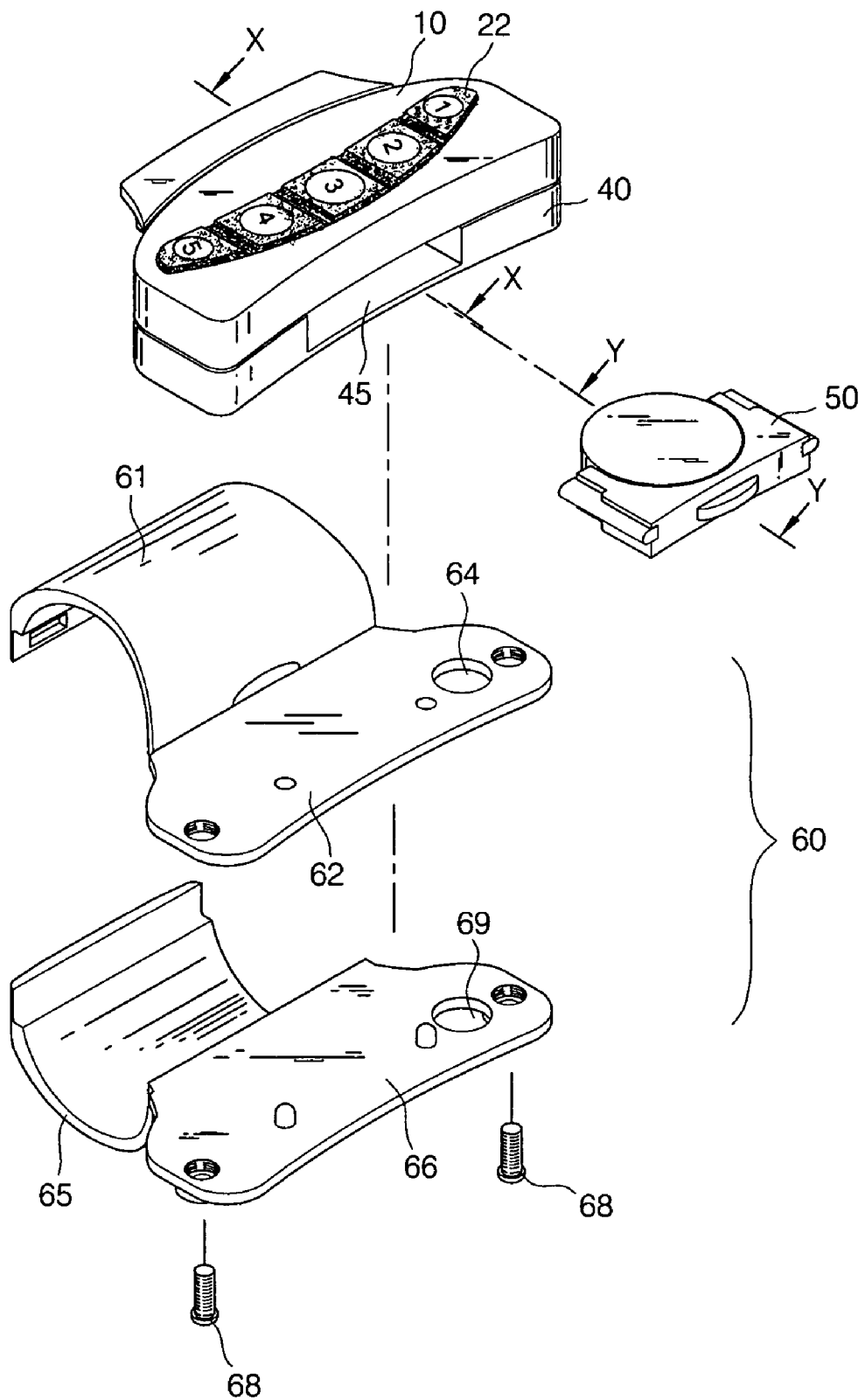
FIG. 4 is an exploded perspective view of a clamp and the first dial of the present invention.
Figures 5A, 5B:
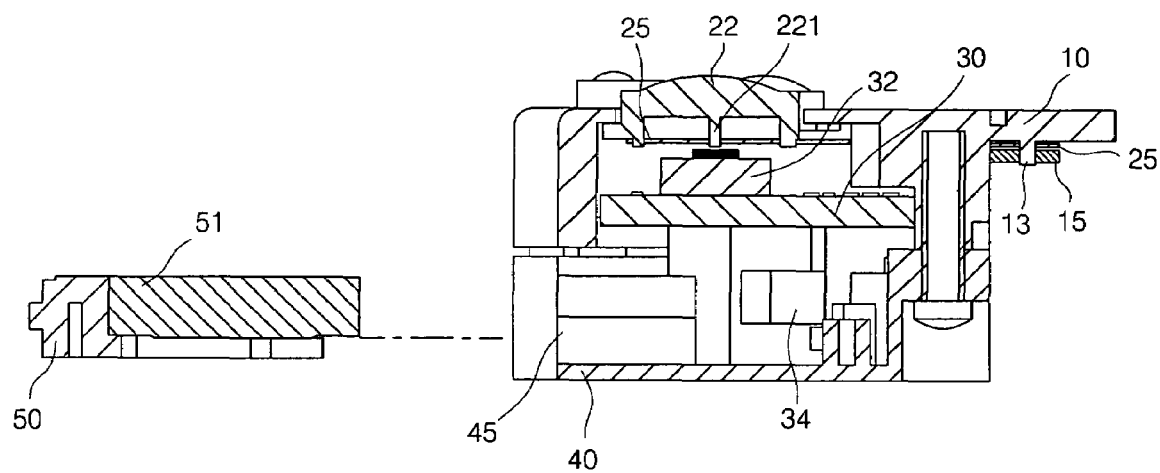
FIG. 5a is a cross-sectional view of the first dial along line X-X in FIG. 4.
FIG. 5b is a cross-sectional view of the first dial along line Y-Y in FIG. 4.
Figure 6:
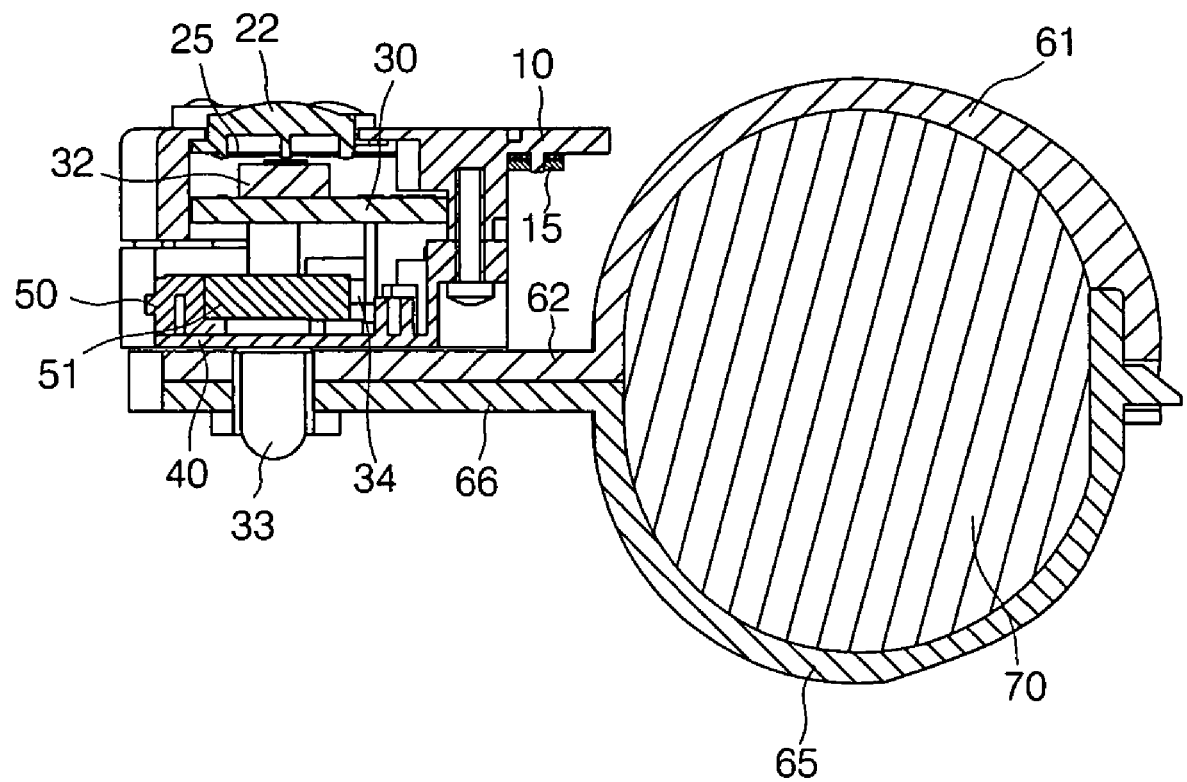
FIG. 6 is a cross-sectional view of the first dial along line Z-Z in FIG. 1.

Referring to the drawings and initially to FIGS. 1-6, a dial system for a steering wheel of an automobile in accordance with the present invention comprises a first dial (1) and a second dial (1') respectively mounted on two opposite sides of the steering wheel (70), wherein the first dial (1) and the second dial (1') wirelessly transmit dial signal to a controller (90). The controller (90) wirelessly transmits signal to a mobile phone (100) that has a bluetooth module. The structure of the second dial (1') is very similar to that of the first dial (1) such that first dial (1) is firstly described. The first dial (1) of the present invention comprises a first housing (10), a dial set (20) received in the first housing (10), a circuit board (30) mounted in the first housing (10) and a second housing (40) attached to the first housing (10) for containing the dial set (20) and the circuit board (30) with the first housing (10). A battery seat (50) with a battery (51) is laterally inserted into the second housing (40) for providing power to the dial system of the present invention. A clamp (60) is mounted to a bottom of the second housing (40) and clamps the steering wheel (70) for positioning the first dial (1) on the steering wheel (70).

The first housing (10) is longitudinal and slightly curved. A longitudinal opening (12) is defined in a top of the first housing (10). The first housing (10) includes multiple stubs (13) downwardly extending therefrom.

The dial set (20) includes a plurality of longitudinal number buttons (22) mounted on a metal plate (25) and received in the longitudinal opening (12). The metal plate (25) has multiple bores (251) defined in one side thereof opposite to the number buttons (22) to allow the multiple stubs (13) extending through the metal plate (25). A stopper (15) is mounted to the first housing (10) to hold the metal plate (25) in place. The stopper (15) has multiple bores (151) each defined to stably receive the stubs (13) for holding the metal plate (25) in place.

The circuit board (30) includes multiple button switches (32) electrically mounted thereon. Each button switch (32) aligns with a corresponding one of the longitudinal number buttons (22). The button switches (32) are operated when the corresponding number buttons (22) are pressed. A radio frequency (RF) transmitter (33) is electrically mounted on a bottom of the circuit board (30) for wirelessly transmitting signals to the controller (90) when the button switches (32) are operated.

The second housing (40) is securely mounted to the first housing (10) to form a space (not numbered) for receiving the dial set (20) and the circuit board (30). The second housing (40) includes multiple threaded hole (41) defined therein and extending therethrough. Multiple screws (48) are screwed through the threaded holes (41) and extend into the first housing (10) to combine the first housing (10) and second housing (40). A hole (43) is defined in a bottom of the second housing (40) to allow the bluetooth transmitter (33) extending through the second housing (40). A lateral opening (45) is defined in the second housing (40) to allow the battery seat (50) inserted into the space between the first housing (10) and the second housing (40) to provide power to the circuit board (30).

A battery (51) is received in the battery seat (50) and electrically connected to a connector (34) that extends from the bottom of the circuit board (30) when the battery seat (50) inserted into the space between the first housing (10) and the second housing (40).

The clamp (60) includes a curved first portion (61) and a curved second portion (65) each having a fixing plate (62, 66) laterally extending from one side thereof and abutting each other and corresponding to the shape of the steering wheel (70). The fixing plates (62, 66) each has a hole (64, 69) defined therein and aligning with each other. The wireless transmitter (33) extends through the holes (64, 69) in the clamp (60) after the present invention being assembled. The clamp (60) is secured on a bottom of the second housing (40) by bolts (68).

The structure of the second dial (1') is similar to that of the first dial (1). The difference between the first dial (1) and the second dial (1') is the arrangement of the dial set (20). In addition, the first dial (1) and the second dial (1') can be connected by a cable for sharing the power and the RF transmitter (33).

The controller (90) is electrically connected to a power source of the automobile for receiving and processing the signals from the first dial (1) and the second dial (1'). The controller (90) includes a circuit board with a bluetooth circuit (not shown) mounted therein for transmitting the signals to the mobile phone (100) that has a bluetooth module. A microphone (91) and a speaker (92) are respectively disposed on the controller (90) such that the driver can use the speaker (92) and the microphone (91) during speaking without taking the mobile phone (100).

As described above, the present invention comprises a first dial (1), a second dial (1') and a controller (90) for receiving, processing and transmitting the signals from the dials (1, 1') to the mobile phone (100). Consequently, the driver can easily dial telephone number with his/her thumbs without turning head for promoting the safety of drive. In addition, the separated design of the present invention corresponds to the ergonomics such that the driver can easily dial buttons (22) when holding the steering wheel (70). Furthermore, the driver can use the speaker (92) and the microphone (91) during speaking without taking the mobile phone.

Although the invention has been explained in relation to its preferred embodiment, it is to be understood that many other possible modifications and variations can be made without departing from the spirit and scope of the invention as hereinafter claimed.

What is claimed is:

1. A dial system for a steering wheel of an automobile comprising a first dial, a second dial respectively mounted on two opposite sides of the steering wheel and a controller disposed on the automobile for receiving and processing signals from the first dial and the second dial, wherein:

each of the first dial and the second dial comprises:
   a first housing including a longitudinal opening, a plurality of stubs, and a stopper having a plurality of bores;
   a dial set received in the first housing and including a metal plate mounted to the first housing, and a plurality of number buttons secured on the metal plate and received in the longitudinal opening in the first housing;
   a circuit board received in the first housing, the circuit board including a plurality of button switches electrically mounted thereon, each button switch aligning with a corresponding one of the longitudinal number buttons such that the button switch is operated when the corresponding number button is pressed, and a radio frequency (RF) transmitter electrically disposed on the circuit board for wirelessly transmitting the signals to the controller;
   a second housing mounted to the first housing to form a space for receiving the dial set and the circuit board;
   a battery seat with a battery laterally inserted into a space between the first housing and the second housing, the battery electrically connected to the circuit board for supplying power to the circuit board when the battery seat is inserted into the space between the first housing and the second housing; and
   a clamp mounted to the bottom of the second housing and adapted to clamp the steering wheel to hold the dial system in place on the steering wheel; and the controller comprises:
   a circuit board with a bluetooth circuit mounted therein for transmitting the signals to a mobile phone having a bluetooth module; and
   a microphone and a speaker respectively disposed on the controller such that a driver can use the speaker and the microphone for conversation while driving without holding the mobile phone; and
   wherein the stubs extend through the metal plate and the bores of the stopper to hold the metal plate in place; and
   further comprising a cable interconnecting the first dial and the second dial such that the first dial and the second dial are adapted to share power and the RF transmitter.

* * * * *